United States Patent Office 3,433,021
Patented Mar. 18, 1969

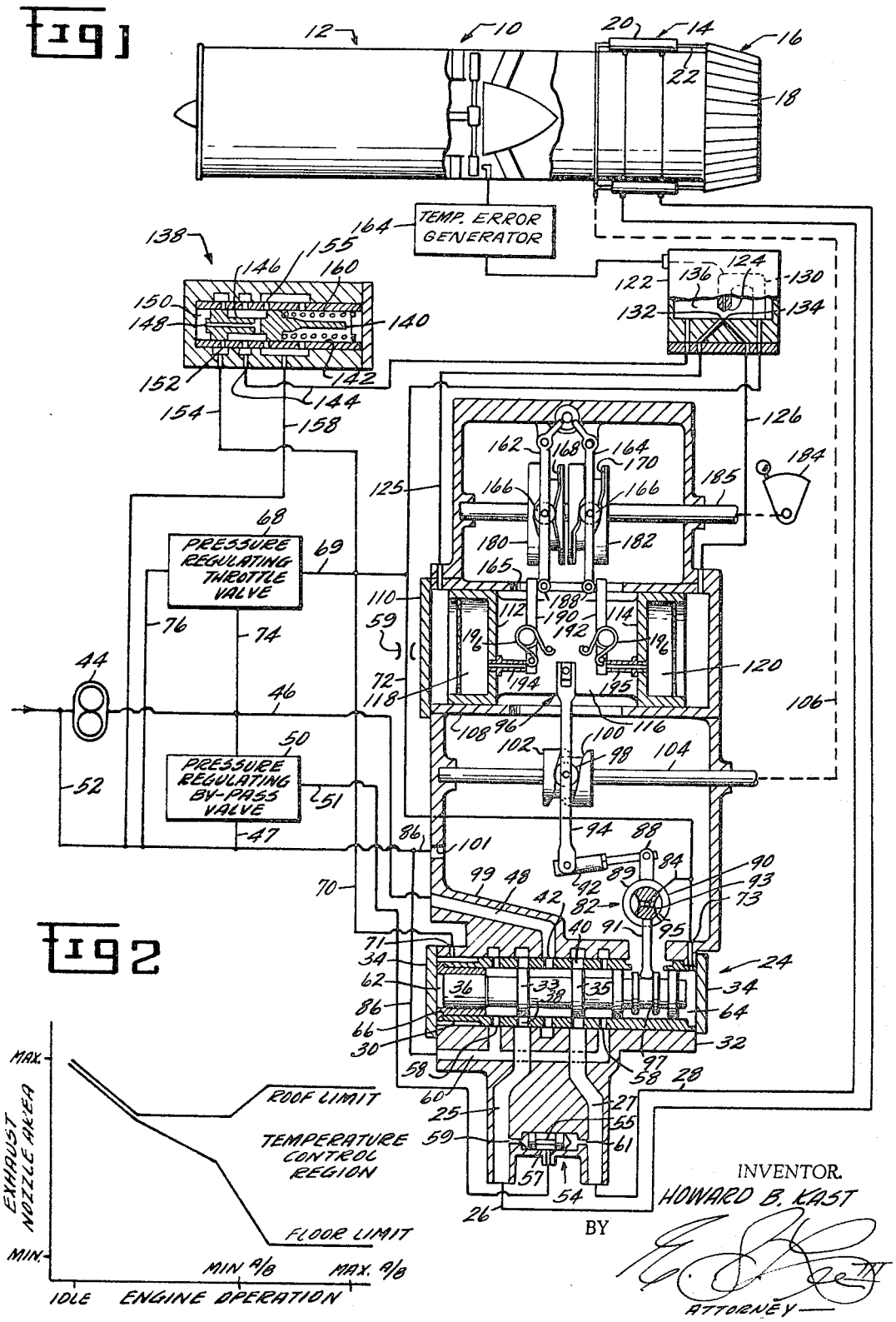

3,433,021
CONTROL SYSTEM HAVING OUTPUT VARIABLY RESPONSIVE TO TWO SIGNAL INPUTS
Howard B. Kast, Fairfield, Ohio, assignor to General Electric Company, a corporation of New York
Filed Dec. 29, 1966, Ser. No. 605,751
U.S. Cl. 60—242   7 Claims
Int. Cl. F02k 1/18; F15b 13/06

ABSTRACT OF THE DISCLOSURE

During low power rates of operation of a gas turbine engine, the area of the propulsive nozzle is varied as a function of engine operation. During higher rates of operation, particularly with augmentation by an afterburner, the primary control of the nozzle is a function of gas stream temperature, with limits provided for preventing too great or too small a nozzle area. Nozzle area is regulated by a control piston which is displaced by fluid pressures on its opposite ends. The position of the control piston regulates hydraulic flow to actuators which vary the nozzle position. The control piston is displaced during low rates of engine operation as a function of the position of a pilot actuated operator lever. During high rates of operation, the pressure balance on opposite ends of the control piston is regulated by a temperature error responsive system. If the temperature error is too great, fluid is vented from one end or the other of the control piston by means positioned by the power lever to limit the piston's movement.

---

The invention described and claimed in the United States patent application herein resulted from work done under United States Government contract FA-SS-65-17. The United States Government has an irrevocable, nonexclusive license under said application to practice and have practiced the invention claimed herein, including the unlimited right to sublicense others to practice and have practiced the claimed invention for any purpose whatsoever.

The present invention relates to improvements in control systems and more specifically to control systems for controlling the area of discharge nozzles in gas turbine engines.

In the exhaust nozzle area control for a gas turbine engine, the area of the nozzle is controlled as a predetermined function of the rate of engine operation during low and intermediate operation to provide optimum thrust output. At high rates of engine operation, the nozzle area is controlled primarily as a function of the engine gas temperature so that the engine gas temperatures are limited to levels consistent with materials commonly used in the engine. Additionally, during the second control mode, certain position limits are provided to insure safe operation of the engine.

In the past, control systems which are used for this purpose have been generally complex. This complexity arises from the fact that the control system must utilize either, or both, of the engine operation and temperature control inputs to control the area. In some cases, this complexity has even resulted in reduced control system time response when switching from one control mode to the other.

Accordingly, it is an object of the present invention to provide a highly simplified and positive area control for the exhaust nozzle of a gas turbine engine as a function of engine operation during low and intermediate rates of operation and as a function of the engine exhaust gas temperature during high rates of operation.

In a broader sense, it is the object of the invention to provide an improved, simplified and reliable control system which varies the position of an element as a function of two control inputs.

In their broader aspects, the above ends are achieved in a fluid control system for positioning an element. The control system comprises a chamber and a piston displaceable therein. Means responsive to the position of the piston are provided for varying the position of the element. First signal generating means are provided, as are means responsive to the first signal for pressurizing one end of the piston thereby displacing the piston. Means are provided for limiting the displacement of the piston. The limiting means comprise means for maintaining a force balance across the piston. Second signal generating means are provided and means responsive to the second signal are provided for varying the position at which the force balance is maintained.

Preferably, the control piston is reciprocable in the chamber and the means for varying the position limits of the control piston limits displacement of the piston between two positions. The position limiting means are closely spaced for one level of the second signal whereby the element is positioned pirmarily as a function of the second signal. The position limiting means are widely spaced for another level of the second signal whereby the element is primarily positioned as a function of the first signal.

In its more specific aspects, the above control system is used to position a variable area exhaust nozzle of a gas turbine engine. The first signal generating means produces a signal proportional to the engine gas stream temperature and the second signal generating means produces a signal proportional to the rate of engine operation. The area of the exhaust nozzle is then controlled as a function of the rate of engine operation for one operating level and controlled primarily as a function of the gas stream temperature for another operating level.

The above and other related objects and features of the present invention will be apparent from the reading of the disclosure found in the accompanying drawing and the novelty thereof pointed out in the appended claims.

FIGURE 1 illustrates a gas turbine engine along with an exhaust nozzle area control system embodying the present invention.

FIGURE 2 illustrates a control schedule input used by the control system of FIGURE 1.

Reference is had to FIGURE 1 which shows in simplified fashion a control system which may be used with a gas turbine engine 10. The gas turbine engine 10 comprises a main gas generator 12 which discharges a hot gas stream through an afterburner 14 wherein additional fuel is injected into the stream and the resultant mixture ignited to increase its energy level. The augmented hot gas stream is discharged through a variable area nozzle 16 to provide a propulsive thrust from the engine 10. The variable area nozzle 16 comprises a series of pivotally mounted flaps 18 whose position defines the effective area of the nozzle 16. The piston rods 22 of a series of nozzle actuators 20 are connected, by suitable mechanical linkage, to the flaps 18 for varying their position. The piston rods 22 of the nozzle actuators 20 are displaced by fluid pressure signals from a control valve 24 via a pair of passageways 25, 27 and conduits 26, 28.

The control valve 24 comprises a sleeve 30 secured in a housing 32 by end caps 34. A spool valve element 36 is displaceable in the sleeve 30 and has a pair of lands 33, 35 which cooperate with a pair of outlet ports 38 and 40 in the sleeve 30 to direct pressurized fluid from an inlet port 42 to the conduits 26 or 28, or both, to provide a continuous circulation of fluid through the actuator 20. The inlet port 42 receives pressurized fluid from an engine driven pump 44 through a supply conduit 46 and passageway 48. A pressure regulating valve 50 is adapted to bypass fluid from the conduit 46 through a conduit 47 to a low pressure return line 52 whenever the pressure in conduit 46 is higher than a predetermined level above the pressure in a pressure sensing conduit 51. The pressure sensing conduit 51 extends from the valve 50 to a pressure selector valve 54. The pressure selector valve 54 comprises a valve element 55 reciprocable in a chamber 57 formed in the housing 32. The chamber 57 has passageways 59, 61 respectively, extending from opposite ends to the passageways 25, 27. The valve element 55 has formed therein a series of longitudinal grooves (not shown) so that as the valve element 55 is shuttled from one end of the chamber 57 to the other in response to fluid pressures in the passageways 25, 27, it passes the higher of the two pressures in conduits 26, 28 to the pressure regulating valve 50.

The pressure regulating valve 50 then maintains the pressure in the supply conduit 46 at a predetermined level above the higher of the two fluid pressures in the conduits 26, 28. Thus, a constant pressure differential is maintained across the control valve 24 to insure that the fluid flow to the actuators 20 from the control valve 24 is directly proportional to the area of the outlet ports 38 or 40 uncovered by the spool valve element 36. Ports 58, in the sleeve 30, on either side of ports 38, 40, provide a return flow path for fluid from the conduits 26 and 28 through passageways 60 to the low pressure return passageway 52.

The spool valve element 36 is positioned in the sleeve 30 by fluid pressure variations in chambers 62, 64 formed at opposite ends of the sleeve 30. The chamber 62 is formed, in part, by a sleeve 66 telescoped into the sleeve 30 so that the area of the spool valve element 36 over which the pressure acts, is approximately one-half the area over which the pressure in chamber 64 acts. The chambers 62, 64 are pressurized by fluid from a pressure regulating throttle valve 68 via servo-pressure supply conduit 69 and conduits 70, 72 and passageways 71, 73. The pressure regulating valve 68 receives pressurized fluid through a conduit 74 from the supply conduit 46 and throttles it to a substantially constant pressure which is a predetermined level above the pressure in return conduit 52 as sensed by a conduit 76.

The pressure in chamber 62 remains constant at substantially the pressure in conduit 69 while the pressure in chamber 64 is varied by a rotary servo-valve 82. The rotary servo-valve 82 comprises an outer sleeve valve element 89 rotatable in response to displacement of a first arm 88, and an inner cylindrical valve element 90 rotatable in response to displacement of a second arm 91. A passageway 84, provides a flow path from passageway 72 to recess 93 in the inner valve element 90 through an axial end thereof. One edge of recess 93 cooperates with a port 95 in the outer valve element 89 to provide a variable area flow path from the valve 82 in response to relative displacement of the arms 88, 91. The flow from the valve 82 is discharged into the interior of housing 32 which is connected to the low pressure return conduit 52 via a port 101 and conduit 86.

The end of the arm 91 is disposed in an annular groove 97 on the spool valve element 36 and the end of the arm 88 is pivotally secured to a link 92. An error bar 94 is pivotally mounted on the other end of link 92 and at its midpoint to a roller 98. The roller 98 rides in the groove 100 of a barrel cam 102 which is secured to a feedback shaft 104, journaled in the casing 32. The rotation of the shaft 104 is made proportional to the displacement of the actuator piston rods 22 by a suitable mechanical interconnection 106 which converts the linear motion of the piston rods 22 into rotational movement. The groove 100 is contoured so that the displacement of the roller 98, in a direction parallel to the axis of the shaft 104, is directly proportional to the displacement of the actuator piston rods 22. The other end of the error bar 94 is pivotally secured to a control piston 96 comprising a pair of opposed pistons 112 and 114 interconnected by a plate 116. The control piston 96 is displaceable in a sleeve 108, secured in the casing 32 by an end cap 110.

Thus, when the control piston 96 is displaced to the right, towards a given position, the error bar 94 causes the arm 88 to rotate counter clockwise thereby discharging fluid from the rotary servo-valve 82 and lowering the pressure in chamber 64 so that the fluid in chamber 62 exerts a greater force on the end of the spool valve element 36. An orifice 59 in the passageway 72 prevents appreciable lowering of the pressure from the conduit 69. The spool valve element 36 is then displaced to the right, thereby pressurizing conduit 28 to extend the actuator piston rods 22. As the spool valve element 36 strokes to the right, it rotates arm 91 to reduce the discharge of fluid from the rotary servo-valve 82 and increases the pressure in chamber 64 to null out the movement of the spool valve 36 at a predetermined position set by the position of the arm 88.

As the actuator piston rods 22 extend, the feedback shaft 104 rotates to displace the roller 98 to the left and null out the displacement input to the lever 88. Accordingly, the spool valve 36 is returned to its neutral position and fluid flow to the actuators 20 is terminated thereby holding the actuator piston rods 22 at a position set by the position of the control piston 96.

It is apparent from the above that the portion of the control system thus described acts as a proportional control system to position the actuator piston rods 22 in accordance with the position of the control piston 96.

The control piston 96 is displaced in the sleeve 108 by fluid flow into chambers 118 and 120 formed in opposite ends of the sleeve 108. The chambers 118 and 120 are supplied from a jet pipe servo-valve 122 via passageways 125 and 126. The jet pipe servo-valve 122 comprises a deflectable nozzle 124 which discharges a fluid power stream from a passageway 130, connected to the servo-pressure supply conduit 69. The power stream is directed into a chamber 136 towards a pair of ports or receivers 132, 134 positioned to selectively pressurize passageways 125, 126 and chambers 118 and 120.

For reasons that will be apparent later, the pressure in servo-valve chamber 136 is maintained at a predetermined level between that of the regulated servo-pressure and the return pressure by a pressure regulating valve 138. The pressure regulating valve 138 comprises a valve element 140 displaceable in a chamber 142. Passageway 144 provides a flow path from the chamber 136 of the jet pipe servo-valve 122 to an annular groove 146 formed in the valve element 140. Passageway 148 provides a flow path between the annular groove 146 and a chamber 150 formed at one end of the valve element 140. One wall of the annular groove 146 cooperates with a series of inlet ports 152 to throttle flow of fluid to the groove 146 from a passageway 154 connected to the servo-pressure supply conduit 69. A series of outlet ports 155 cooperate with the opposite wall of the groove 146 to provide a variable area discharge flow path from the annular groove 146 through a passageway 158 to the return pressure line 52. A spring 160 disposed at the opposite end of the chamber 142 urges the valve element 140 to a position where flow to the discharge line 158 is throttled and flow from the pressure regulating line 154 is unrestricted. The pressure in servo-valve chamber 136 is applied to the valve element 140 in chamber 150 to vary its position and maintain the discharge pressure at the predetermined level.

The jet pipe servo-valve 122 may be any type of servo-valve, as are now commercially available, which provides a deflection of the nozzle 128 to produce a fluid flow into the receiver ports 132 or 134 proportional to electrical input signals.

The servo-valve 122 receives electrical input signals from a temperature amplifying device 164 which produces an electrical output signal proportional to the difference between the actual exhaust gas discharge temperature from the main gas generator 12 and a predetermined reference temperature which is selected to be the highest temperature consistent with efficient functioning of the engine. The error signal generated by the temperature amplifier 164 causes the servo-valve nozzle 124 to deflect towards one of the receivers 132 or 134, thereby causing a fluid flow to chamber 118 or 120 to urge the control piston 96 into motion with a velocity proportional to the magnitude of the temperature error signal. As the piston 96 is displaced, the area of the exhaust nozzle is varied in a direction to vary its resistance to the gas stream from the afterburner 14 and thus maintain the exhaust gas temperature at the reference temperature.

When the control piston 96 functions to maintain the gas temperature at the predetermined level, it acts as an integrator because its velocity is proportional to the temperature error signal. In order to insure that the velocity of the servo-valve power stream and hence the control piston 96 remain proportional to the temperature error signal generated by the temperature amplifier 164, the pressure regulator 68 is of a type that compensates for viscosity changes of the fluid utilized by the jet type servo-valve 122. An example of such a device suitable for this purpose may be found in application No. 553,-545, entitled Viscosity Compensated Flow Regulating Device, assigned to the same assignee of the present invention.

A second control input is provided to the control piston 96 by a pair of upper and lower limiting levers 162, 164, each having one end pivotally mounted to the housing 32. Rollers 166, secured to the levers 162, 164 ride in grooves 168, 170 of barrel cams 180, 182. The cams 180, 182 are secured to a shaft 185 which is journaled in the casing 32 and receives rotary displacement inputs from an operator controlled lever 184.

The opposite ends of the levers 162, 164 extend through an opening 165 in the sleeve 108 and have secured thereto rollers 188 which are engageable with the upper ends of flapper valve arms 190, 192. The arms 190, 192 are pivotally secured to the control piston 96. A pair of torsion springs 196 hold the lower ends of the arms 190, 192 against bleed orifices 194, 195 in the piston 112, 114.

Whenever the servo-valve nozzle 124 is deflected to displace the control piston 96 in a direction which exceeds an upper position limit set by the lever 162, the flapper arm 190 is pivoted to bleed chamber 118 to the low pressure interior of housing 32. This bleeding action gives a force balance on opposite sides of the piston 96 and maintains it in a given or upper limit position. When the jet nozzle 124 is deflected so that the power stream impinges on the receiver port 132, the intermediate pressure maintained in the valve chamber 136 is available to obtain the force balance across piston 69. The lower position limits of the control piston 96 are set by the lever 164 in a similar fashion.

The contours of the grooves 168 and 170 are selected so that the position of the levers 162 and 164 control the area of the exhaust nozzle 18 within maximum (roof) and minimum (floor) limits as a function of throttle lever 184 angle in accordance with the schedule shown in FIGURE 2. It is apparent that the nozzle area limit schedules are closely spaced for low and intermediate engine speeds so that the area of the nozzle 18 is primarily a scheduled function of the pilot lever position. Conversely, at higher speeds and during operation of the afterburner 14, the limits imposed by the levers 162 and 164 are expanded so that the area of the nozzle is controlled as a function of temperature error signal to maintain a desired temperature at the discharge of the gas generator 12.

Thus, the system described provides a control of nozzle area as a scheduled function of throttle angle during low and intermediate throttle angles and as a function of exhaust gas temperature at high throttle positions. It should be noted that by combining the control inputs from throttle and the temperature error into a single control piston enables smooth changeover from throttle schedule control to temperature control without any backlash or time delay.

The described invention provides a highly effective control for an exhaust nozzle of a gas turbine engine, but is not limited to such an application and may be used in the position control of any element. While the preferred form of the present invention has been described, it is to be understood that modifications will be apparent to those skilled in the art without departing from the spirit of the invention.

The scope of the invention, therefore, is to be determined solely by the following claims.

Having thus described the invention, what is claimed as novel and desired to be secured by Letters Patent of the United States is:

1. A fluid control system for varying the position of an element, said control system comprising:
   a chamber,
   a control piston displaceable therein,
   means responsive to the position of said piston for varying the position of said element,
   first signal generating means,
   means responsive to said first signal for pressurizing one end of said piston thereby displacing said piston,
   means for limiting displacement of said piston, said limiting means comprising:
   second signal generating means, and
   means responsive to said second signal for maintaining a force balance across said piston at a position in one direction of piston travel which reflects only the magnitude of said second signal.

2. A fluid control system as in claim 1 wherein;
   said control piston is reciprocable in said chamber,
   said means responsive to said second signal is adapted to limit the displacement of said piston between two positions, said positions being closely spaced for one level of said second signal and being widely spaced for another level of said second signal,
   whereby the element is positioned as a function of said second signal for one level of said second signal and said element is positioned primarily as a function of said first signal for another level of said second signal.

3. A fluid control system as in claim 2 wherein;
   said means for pressurizing said piston comprises means for creating a pressure differential across said piston so that said piston is displaced with a velocity proportional to the magnitude of said first signal,
   said force balance maintaining means comprises valve means for equalizing the pressure on opposite sides of said piston.

4. A fluid control system as in claim 3 in combination with a gas turbine engine generating a hot gas stream and having a variable area exhaust nozzle wherein;
   the area of said variable area exhaust nozzle is varied by said control system,
   said first signal generating means generates a signal proportional to the difference between the actual gas stream temperature and a desired temperature,
   said second signal generating means comprises means for generating a signal proportional to the operating level of said engine,
   said means responsive to said second signal limits the displacement of said control piston between closely spaced limits for relatively low engine operating levels and between widely spaced limits for relatively high engine operating levels,
   whereby the area of said nozzle is controlled primarily as a function of said engine operating levels at relatively low operating levels and controlled primarily as a function of the temperature signal from said first signal generating means.

5. Apparatus as in claim 4 wherein;
said control piston comprises:
a pair of opposed pistons,
means for interconnecting said pistons,
said force balance maintaining valve means comprise:
passageway means from the end of each opposed piston to the portion of said control piston intermediate the ends, said intermediate portion of said control piston being maintained at a relatively low level,
an arm pivotally mounted on each of said pistons for restricting flow through said passageways,
means for urging said arms into a position wherein flow through said passageways is restricted,
said second signal responsive means comprises:
a pair of levers extending between said opposed pistons and engageable with said valve means arms,
means for varying the positions of said levers in response to said second signal,
whereby as said control piston is displaced by creating a pressure differential between the ends of said opposed pistons to a position limit set by said levers, one of the arms is pivoted to open the passageway and equalize the pressures on opposite ends of said control piston.

6. Apparatus as in claim 5 wherein;
said means for creating a pressure differential on opposite sides of said piston comprises,
a chamber,
a nozzle for discharging a power stream through said chamber,
a pair of passageways positioned to selectively receive the power stream for passage to the ends of said control piston chamber,
means for deflecting said nozzle proportional to the magnitude of said first signal,
whereby selective flow of said power stream into said receiver passageways urges said piston into motion with a velocity proportional to the magnitude of said first signal.

7. Apparatus as in claim 5 further comprising:
means for maintaining the pressure in said last mentioned chamber at a level higher than the pressure in the intermediate portion of said control piston.

References Cited
UNITED STATES PATENTS 2,936,581   5/1960   Williams _____ 60—242

JULIUS E. WEST, *Primary Examiner.*

U.S. Cl. X.R.

91—367, 461; 251—26; 317—234